United States Patent
Fofonoff et al.

(10) Patent No.: US 12,311,535 B2
(45) Date of Patent: May 27, 2025

(54) ROBOTIC DEVICE CONFIGURATION

(71) Applicant: RightHand Robotics, Inc., Somerville, MA (US)

(72) Inventors: Timothy A. Fofonoff, Cambridge, MA (US); John Sullivan, Malden, MA (US)

(73) Assignee: RightHand Robotics, Inc., Charlestown, MA (US)

( * ) Notice: Subject to any disclaimer, the term of this patent is extended or adjusted under 35 U.S.C. 154(b) by 747 days.

(21) Appl. No.: 17/623,073

(22) PCT Filed: Jun. 25, 2020

(86) PCT No.: PCT/US2020/039484
§ 371 (c)(1),
(2) Date: Dec. 27, 2021

(87) PCT Pub. No.: WO2021/025800
PCT Pub. Date: Feb. 11, 2021

(65) Prior Publication Data
US 2022/0266458 A1    Aug. 25, 2022

Related U.S. Application Data

(60) Provisional application No. 62/883,689, filed on Aug. 7, 2019.

(51) Int. Cl.
*B25J 15/10*    (2006.01)
*B25J 15/04*    (2006.01)
*B25J 15/06*    (2006.01)

(52) U.S. Cl.
CPC ....... *B25J 15/0491* (2013.01); *B25J 15/0483* (2013.01); *B25J 15/0616* (2013.01); *B25J 15/10* (2013.01)

(58) Field of Classification Search
CPC B25J 15/0491; B25J 15/0433; B25J 15/0483; B25J 15/10; B25J 15/0616; B25J 15/0052
See application file for complete search history.

(56) References Cited

U.S. PATENT DOCUMENTS

| 4,604,787 A | 8/1986 | Silvers, Jr. |
| 5,044,063 A | 9/1991 | Vollmer |

(Continued)

FOREIGN PATENT DOCUMENTS

JP    2000024975 A    1/2000

OTHER PUBLICATIONS

Friedman et al., Automated Tool Handling for the Trauma Pod Surgical Robot, 2007, IEEE, p. 1936-1941 (Year: 2007).*

(Continued)

*Primary Examiner* — Mcdieunel Marc
(74) *Attorney, Agent, or Firm* — Danielson Legal LLC

(57) ABSTRACT

Robotic device configuration methods and systems. The methods described herein may involve operably positioning a robotic device with respect to a storage rack, wherein the storage rack holds at least one first coupling member configured with a first tool, and the robotic device includes a second coupling member; operably connecting the second coupling member to the first coupling member; and removing the first coupling member configured with the first tool from the storage rack.

18 Claims, 12 Drawing Sheets

(56) References Cited

U.S. PATENT DOCUMENTS

| | | | | |
|---|---|---|---|---|
| 5,903,457 | A | * | 5/1999 | Chang .................... B23Q 41/08 |
| | | | | 700/95 |
| 5,993,365 | A | | 11/1999 | Stagnitto et al. |
| 6,321,138 | B1 | * | 11/2001 | Livesay ................ B65G 1/0414 |
| | | | | 700/215 |
| 6,898,484 | B2 | * | 5/2005 | Lemelson .............. G05B 19/19 |
| | | | | 700/262 |
| 7,304,855 | B1 | * | 12/2007 | Milligan .............. G11B 33/128 |
| 9,272,423 | B2 | | 3/2016 | Gordon et al. |
| 9,865,602 | B2 | * | 1/2018 | Kwon .................. H10B 12/315 |
| 2004/0192524 | A1 | | 9/2004 | Nolte et al. |
| 2008/0143361 | A1 | * | 6/2008 | Casterton ........... G01R 31/2893 |
| | | | | 324/757.01 |
| 2008/0253612 | A1 | | 10/2008 | Reyier et al. |
| 2010/0307279 | A1 | | 12/2010 | Campagna et al. |
| 2014/0367962 | A1 | | 12/2014 | Girtman |
| 2016/0236357 | A1 | | 8/2016 | Kalb et al. |
| 2017/0095825 | A1 | | 4/2017 | Manabe et al. |
| 2019/0217471 | A1 | | 7/2019 | Romano et al. |

OTHER PUBLICATIONS

Choi et al., Trends and opportunities for robotic automation of trim & final assembly in the automotive industry, 2010, IEEE, p. 124-129 (Year: 2010).*

Curran et al., Robotic Experiences or Traumatic Experiences? 1994, IEEE, p. 115-119 (Year: 1994).*

Abidi et al., A multisensor robotic module interchange system for space maintenance, 1989, IEEE, p. 7-12 (Year: 1989).*

International Search Report for PCT/US2020/039484, Oct. 9, 2020. 2 pages.

Written Opinion for PCT/US2020/039484, Oct. 9, 2020. 3 pages.

Extended European Search Report for European Application No. 20850343.3, PCT/US2020/039484, Jul. 14, 2023, 10 pages.

* cited by examiner

ROBOTIC DEVICE CONFIGURATION

CROSS REFERENCE TO RELATED APPLICATIONS

The present application is the national phase of International (PCT) Patent Application No. PCT/US2020/039484, filed internationally on Jun. 25, 2020, and claims the benefit of and priority to U.S. provisional application No. 62/883,689, filed on Aug. 7, 2019, the entire disclosures of each of which are incorporated by reference as if set forth in their entirety herein.

TECHNICAL FIELD

Embodiments described herein generally relate to robotic systems and methods and, more particularly but not exclusively, to systems and methods for configuring robotic devices.

BACKGROUND

Logistic operations such as those in warehouse environments often include robotic devices to gather items from a first location (e.g., a container) and place the items at a second location (e.g., on a conveyor belt). Accordingly, these operations require the robotic device to first successfully grasp the item. Existing robotic devices often include a suction device that generates a suction force on an item to "grasp" the item.

Oftentimes, however, suction devices (e.g., suction cups) are configured for specific sizes or configurations of items. Accordingly, if a suction device is misconfigured, then the device may be unable to grasp an item and the picking operation would not be completed. This would halt the picking operation, and may require a human operator to intervene to pick-and-place the item.

Similarly, while a first suction device may be unable to grasp an item, another suction device (e.g., a larger or smaller suction device) may be able to grasp the item. However, a human operator would need to attach the second suction device to the robotic device. This would also contribute to downtime and inconvenience the human operator.

A need exists, therefore, for systems and methods for configuring robotic devices that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a system for configuring a robotic device. The system includes a storage rack including a plurality of slots that are each configured to hold a first coupling member, wherein the first coupling member includes a first tool; and a robotic device configured with a second coupling member, wherein the second coupling member is configured to operably engage the first coupling member to remove the first coupling member and the first tool from the storage rack.

In some embodiments, the first tool is a first suction device. In some embodiments, the robotic device is further configured to operably position the first coupling member at a first location on the storage rack and release the first coupling member and the first suction device on the storage rack, move to a third coupling member at a second location on the storage rack, wherein the third coupling member is configured with a second suction device, and operably engage the third coupling member using the second coupling member to remove the third coupling member and the second suction device from the storage rack. In some embodiments, the first suction device and the second suction device are different types than each other, different sizes than each other, or have different levels of wear.

In some embodiments, the second coupling member includes an extension member with a seal component, the seal component creating a vacuum seal with the first coupling member upon the second coupling member engaging the first coupling member.

In some embodiments, the first tool includes a plurality of suction devices.

In some embodiments, the first coupling member is configured with an identification chip, the storage rack is configured with at least one spring loaded pin, and the identification chip is configured to engage the at least one spring loaded pin upon insertion of the first coupling member at the storage rack to provide at least one of an electrical connection indicating that the first coupling member is positioned on the storage rack and a communication link with which to communicate data.

In some embodiments, the first coupling member is configured with at least one latch that is configured to hold the first coupling member in a closed position, and open the first coupling member upon being positioned on the storage rack to enable the first coupling member to receive the second coupling member.

According to another aspect, embodiments relate to a method for configuring a robotic device. The method includes operably positioning a robotic device with respect to a storage rack, wherein the storage rack holds at least one first coupling member configured with a first tool, and the robotic device includes a second coupling member, operably connecting the second coupling member to the first coupling member, and removing the first coupling member configured with the first tool from the storage rack.

In some embodiments, the first tool is a first suction device. In some embodiments, the method further includes performing a first picking operation on a first item using the first suction device, and operably positioning the first coupling member at a location on the storage rack and releasing the first coupling member from the second coupling member. In some embodiments, the method further includes operably connecting the second coupling member to a third coupling member on the storage rack, wherein the third coupling member is configured with a second suction device, removing the third coupling member configured with the second suction device from the storage rack, and performing a second picking operation on a second item using the second suction device. In some embodiments, the first suction device and the second suction device are different types than each other, different sizes than each other, or have different levels of wear. In some embodiments, the first suction device is replaced by the second suction device based on a condition of the first suction device.

According to yet another aspect, embodiments relate to a system for configuring a robotic device. The system includes a storage rack including a plurality of locations that are each configured to hold a tool, wherein the storage rack is configured to selectively receive a suction device at a location on the storage rack and selectively release the suction device upon engagement by a robotic device.

In some embodiments, the storage rack further includes at least one identification reader to detect a tool in a location.

In some embodiments, the system further includes a first coupling member operably configured to be received by the storage rack at a location, wherein the first coupling member is configured with the tool. In some embodiments, the robotic device comprises a second coupling member, and the first coupling member is configured to operably connect with the second coupling member and be removed from the storage rack upon operably connecting with the second coupling member. In some embodiments, the first coupling member includes at least one latch configured to secure the second coupling member to the first coupling member upon receiving the second coupling member.

In some embodiments, the storage rack is configured to hold suction devices of different sizes, different configurations, or different levels of wear.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
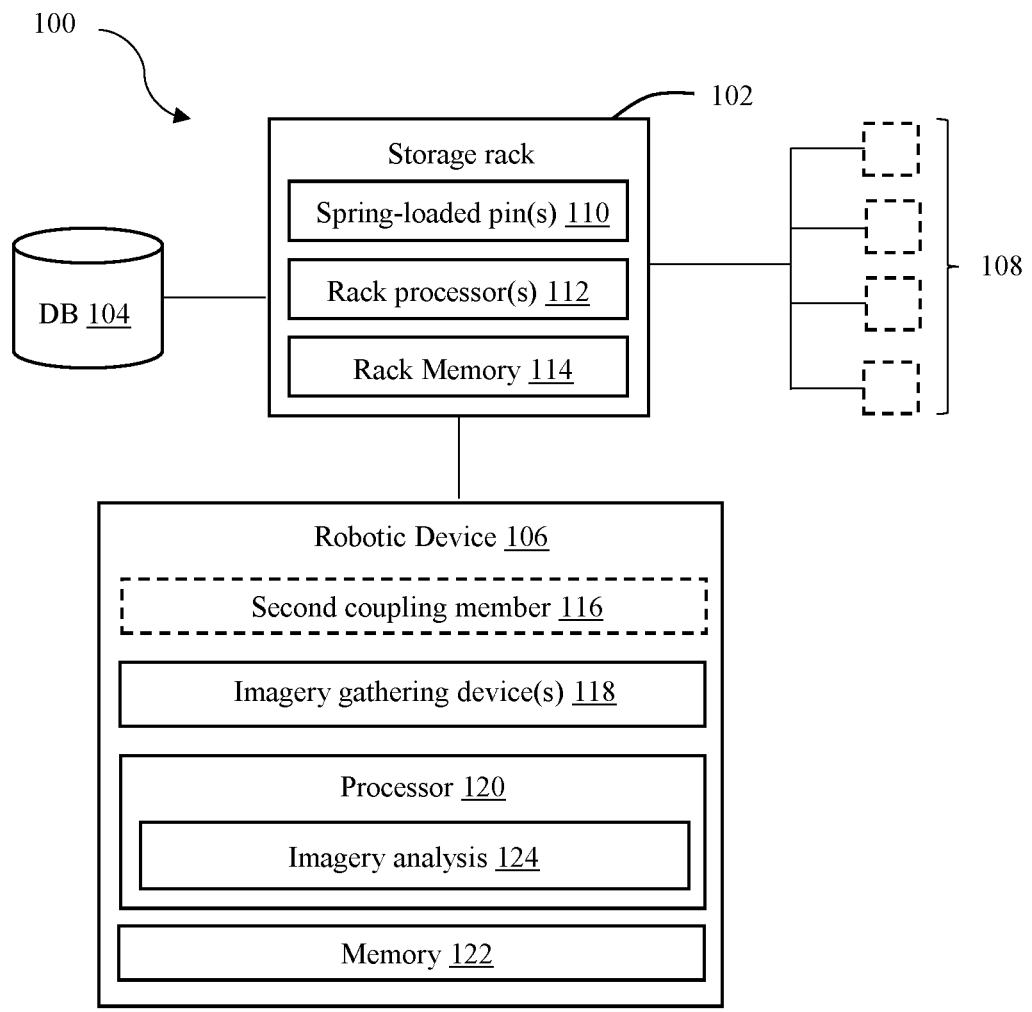
FIG. 1 illustrates a system for configuring a robotic device in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Picking operations generally involve a robotic device executing a grasp attempt to grasp an item (e.g., from a shelf, container, bin, or the like), and then placing the item at another location. The "place" location may be another container, bin, conveyor belt, or the like. The types of pick-and-place locations may vary and may depend on the application or the environment in which the picking operation is to be performed.

As discussed previously, suction devices or other types of end effectors may be unable to "grasp" a particular item. This may be due to the item's size or weight, for example. Additionally or alternatively, this may be due to the condition of the suction device, such as if it has a considerable amount of wear.

In these situations, a human operator may need to intervene to perform the picking operation themselves or a human operator may need to change the suction device that is configured with the robotic device. This inevitably contributes to down time and consumes resources as a human operator is required to intervene.

The embodiments described herein provide systems and methods that enable a robotic device to autonomously exchange its suction devices or other tools. More specifically, the systems and methods may enable a robotic device to autonomously change which suction device(s) are configured with the robotic device and used to perform a picking operation (or some other task). The disclosed embodiments provide a pneumatic coupling and tool storage system that allows a tool mounted on a robotic device to be exchanged with another tool and without human interaction.

Although the present application is largely directed towards embodiments in which a robotic device uses one or more suction devices to perform a picking operation, the embodiments described herein are not limited to picking operations or suction devices. Rather, the embodiments described herein may be extended to other tools and to perform other operations.

A storage rack may store a plurality of suction devices, including suction devices of different sizes or configurations. The suction devices may be stored on the rack in such a way that a robotic device can engage the storage rack and/or suction device(s) thereon, operably connect with a suction device, and remove the suction device from the storage rack to perform a picking operation. Once the picking operation is complete, the robotic device may place the suction device back on the storage rack. The robotic device may then connect with and remove a different suction device from the storage rack and perform other picking operations.

Although the present application largely discusses suction devices and their use in picking operations, suction devices may be substituted with other types of tools for performing other types of tasks. These may include tools useful in picking operations, for example, and include tools such as box cutting devices, container or box-opening devices, vacuum-operated pinching devices, measurement probes, cleaning tools, trash-disposal tools (e.g., for removing excess cardboard or plastic), or the like. These devices are merely exemplary and other devices whether available now or invented hereafter may be used in conjunction with the embodiments described herein.

The embodiments described herein generally involve five components: (1) a robotic device; (2) a storage rack; (3) a suction device; (4) a first coupling member that is configured with the suction device; and (5) a second coupling member that is configured with the robotic device and is able to operably connect with the first coupling member. In operation, the first coupling member configured with the suction device may initially be positioned on the storage rack. For example, a human operator may stock the storage rack with suction devices (and their associated coupling members) of various sizes, materials, and configurations. The storage rack can be populated with a variety of suction devices on coupling members when the system is first set up. Additionally or alternatively, the storage rack can be populated at any time during operation. Light emitting diodes on the storage rack may indicate system status and the status at each opening location or slot, i.e., whether a slot is populated or empty.

The first and second coupling members may comprise a female coupling member and a male coupling member, respectively. One of the coupling members may mount to the picking device in any appropriate orientation. This ensures that the mounted coupling member can be replaced on the picking device while maintaining proper registration with the storage rack. For example, one embodiment of the system may have one or more tubes that extend from the picking device and to a location on the storage rack.

To equip itself with the suction device, the robotic device moves in six degrees of freedom to interact with mechanical features of the coupling members and/or the storage rack. Specifically, the robotic device may move its coupling member to operably connect with or otherwise engage the complementary coupling member. Upon or after connection is made, the robotic device may move from the storage rack (with the suction device attached) and perform the picking operation(s).

FIG. 1 illustrates a system 100 for performing a picking operation in accordance with one embodiment. The system 100 may include a storage rack 102, one or more databases 104, and a robotic device 106. The storage rack 102 may also hold one or more first coupling members 108 (shown in phantom).

The storage rack 102 may include one or more spring-loaded pins 110 and one or more rack processors 112 that execute instructions stored in rack memory 114. The storage rack 102 may be in operable communication with the database(s) 104.

The database(s) 104 may store data regarding, for example, items commonly grasped and which suction devices are able to grasp said items. The database(s) 104 may also store data regarding how many picking operations a particular suction device has performed. This data may be useful in determining if and when a particular device should be replaced due to wear, for example.

The database(s) 104 may additionally or alternatively store data regarding particular suction devices and tools. Each individual suction device or tool may be associated with a unique reference ID retrieved from an identification chip and accompanying record stored in the database(s) 104. These records my keep track of the amount of time a particular suction device has been in use (e.g., as determined by the number of operations performed).

Several types of data may be stored in and accessed through the identification chips. With unique identifications, this type of data may be stored in the database(s) 104 or elsewhere as well.

The spring-loaded pins 110 may be mounted on the storage rack 102 in such a way that they contact a first coupling member 108 during the time in which the first coupling member 108 is on the storage rack 102. This contact creates an electrical connection that establishes that a first coupling member (and likely therefore a suction device) is positioned on the storage rack 102. This contact may also enable the communication of certain data to and from the rack processor 112, such as identification data of the first coupling member (and the associated suction device (s)).

One or more networks may link the various assets and components 102-06. The network(s) may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The robotic device 106 may be tasked with performing one or more picking operations. As discussed previously, picking operations generally involve a robotic device picking an item from a first location and placing the item at a second location. In accordance with the embodiments described herein, the picking device 106 may include at least one second coupling member 116 configured to be in operable connectivity with a first coupling member 108 (which may include one or more suction devices).

The present application largely discusses the use of suction devices to grasp items. In these embodiments, the robotic device 106 may further include any vacuum generators, valves, and tubing required to provide the needed suction force.

In operation, the robotic device 106 may move the suction device(s) close enough to the item or otherwise in contact with the item such that the generated suction force causes the item to stay in contact with the robotic device 106. Once the item is grasped, the robotic device 106 may move the item to the desired location. The suction force may be stopped so that the suction device(s) release the item at the desired location.

The robotic device 106 may further include, be configured with, or otherwise be in communication with imagery gathering devices 118. These imagery gathering devices 118 may be directed towards items to be picked and may gather imagery regarding an item such as the item's orientation, configuration, location, or other type of information that may affect whether the picking device 106 can grasp the item. Similarly, the imagery gathering devices 118 may gather imagery data regarding the storage rack 102 that may be used to determine how to approach the storage rack 102 to connect with the coupling members 108 thereon.

These imagery gathering devices 118 may include, for example and without limitation, any one or more of RGB cameras, stereoscopic cameras, LIDAR, sonar sensors, etc. The exact type or configuration of the imagery gathering devices 118 used may vary and may include any type of sensor device whether available now or invented hereafter as long as they can gather data required to accomplish the objectives of the embodiments herein. The location or placement of the imagery gathering devices 118 may vary as well, and may depend on the type of imagery gathering devices 118 used.

The memory 122 (and rack memory 114) may be L1, L2, or L3 cache or RAM memory configurations. The memory 122 may include non-volatile memory such as flash memory, EPROM, EEPROM, ROM, and PROM, or volatile memory such as static or dynamic RAM, as discussed above. The exact configuration and type of memory 122 may of course vary as long as instructions for performing the steps of the claimed embodiments can be executed by the processor 120.

The processor 120 may execute instructions stored on memory 122 to determine whether the robotic device 106 is able to grasp an item. Specifically, the imagery analysis module 124 may execute one or more imagery analysis tools to determine whether the picking device 106 can grasp the item. For example, if an item is too large compared to the size of a suction device, then the processor 120 may determine that the robotic device 106 is unable to grasp the item. Similarly, the imagery analysis module 124 may detect whether or not the item has a flat surface large enough to be grasped by one or more suction devices.

These determinations may therefore be reliant on knowledge regarding abilities, sizes, and/or configurations of the suction device(s) and data stored in the one or more databases 104. This data may include the number of suction devices, the size of the suction device(s), the force generated, or any other type of information that may affect whether the picking device is able to grasp an item.

Similarly, knowledge regarding the items may be considered as well. For example, the database(s) 104 may store data regarding an item's weight, shape, length, width, depth, contents, surface coefficient of friction, configuration (e.g., whether the item has any specific locations ideal for grasping), deformability, or any other type of data or characteristics that may affect whether the robotic device 106 is able to grasp the item.

The robotic devices 106 may also include or otherwise be configured with force and torque-sensing abilities at the end effector to allow sensing tools to be effective. With this ability, the storage rack(s) and the robotic device can be automatically calibrated by having the robotic device approach and touch known geometry on the storage rack.

Figure 2:
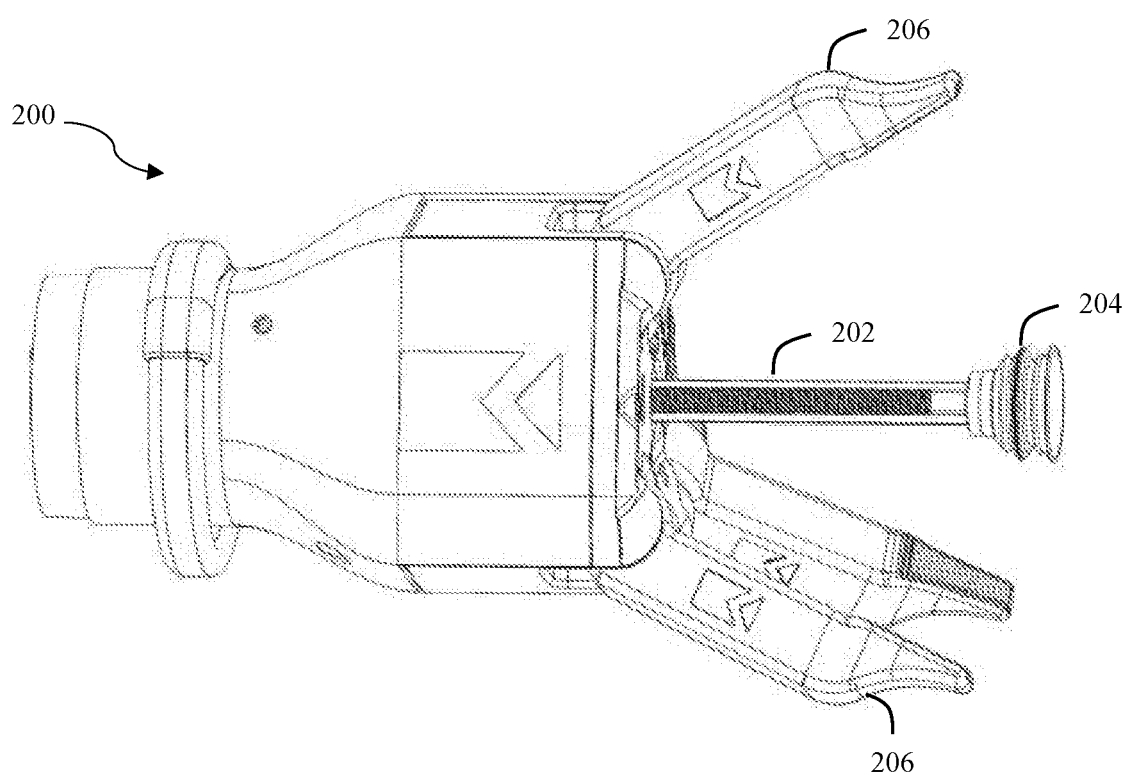
FIG. 2 illustrates a robotic device in accordance with one embodiment.

FIG. 2 illustrates an exemplary robotic device 200 in accordance with one embodiment. In this particular embodiment, the robotic device 200 may include an extension member 202 with one or more suction devices 204 attached thereto. In operation, the robotic device 200 may position itself sufficiently close to an item such that the suction device 204 may, via a generated suction force, come into contact with and stay in contact with the item. Although not required, the robotic device 200 may also include a plurality of finger portions 206 to stabilize the item.

Figure 3:
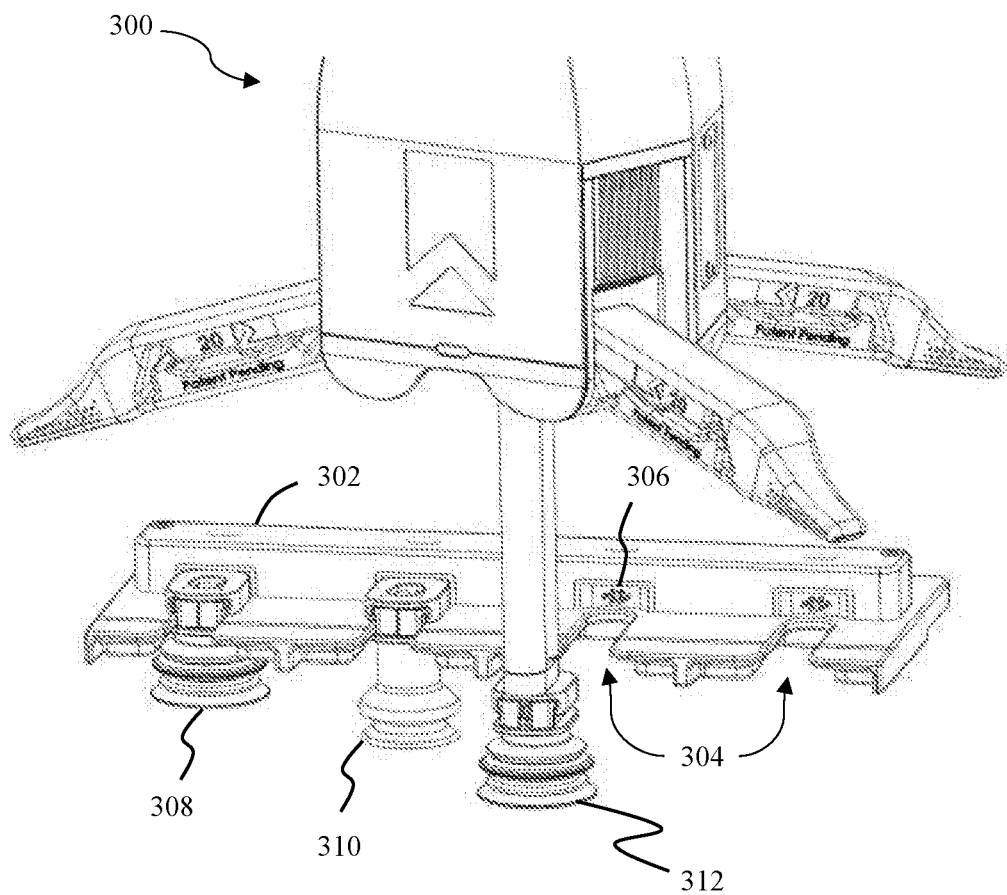
FIG. 3 illustrates a robotic device and a storage rack in accordance with one embodiment.

FIG. 3 illustrates a robotic device 300 such as the picking device 200 of FIG. 2 interacting with a storage rack 302. The storage rack 302 may be similar to the storage rack 102 of FIG. 1, for example.

The storage rack 302 may include a plurality of locations such as slots that are able to hold or otherwise support suction devices. Each opening 304 may also be associated with one or more spring-loaded pins 306 such as the pins 110 of FIG. 1. As discussed previously, these pins 306 may help identify when there is coupling member present in an opening 304 and also act as a link to exchange data and communications. As seen in FIG. 3, suction devices 308 and 310 are positioned in openings 304 on the storage rack 302. Additionally, the robotic device 300 is seen as placing a suction device 312 into one of the openings 304. These suction devices are operably attached to coupling members, discussed below.

Although not shown in FIG. 3, the storage racks of the embodiments herein may include a "discard" slot with an optional receptacle. This discard slot may be configured with the storage rack or separate from the storage rack, and may receive broken or worn-out suction devices or tools. This could be a slot that continuously removes and accepts coupling members (with suction devices or tools) to provide an effective "point of no return" for devices that should be taken out of service. This could make it obvious to operators where and when new devices are needed.

The discard slot could be large enough to receive a number of devices, such that a newly added suction device pushes the next suction device inward or otherwise into a receptacle. The discard slot could also be used if there are no open slots available on the storage rack to allow exchanges to continue.

Figure 4:
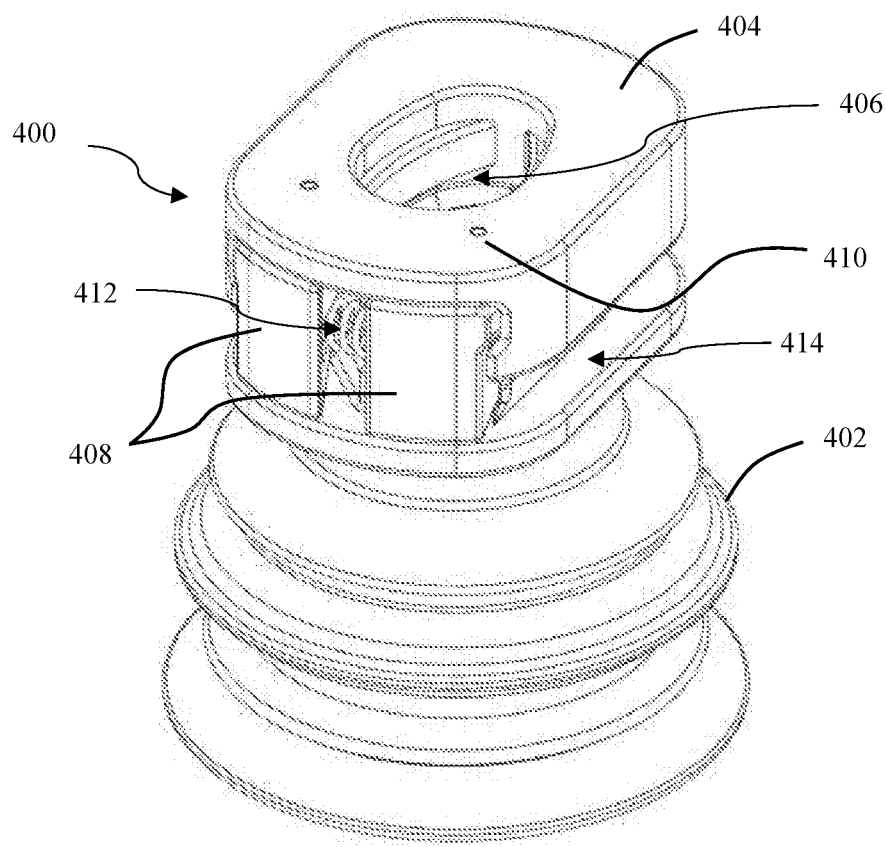
FIG. 4 illustrates a perspective view of a female coupling member in accordance with one embodiment.

FIG. 4 illustrates front perspective view of a female coupling member 400 in accordance with one embodiment. As seen in FIG. 4, the female coupling member 400 is operably configured with a suction device 402. The female coupling member 400 may include a top portion 404 that forms an aperture 406 configured to receive an extension component of a second coupling member (not shown in FIG. 4).

Although they are only partially shown in FIG. 4, the female coupling member 400 may include a pair of latches 408 that are rotationally pre-loaded about dowel pins 410 by spring 412 to be in a "closed" position. That is, the latches 408 are in this closed position when the female coupling member 400 is not in a storage rack.

The female coupling member 400 may also include slot portion(s) 414 that slide along portions of a storage rack in order to store the female coupling member 400 on the storage rack. As the female coupling member 400 slides along these portions of the storage rack (such as at an opening 304 of FIG. 3), the storage rack will contact the latches 408. This contact creates a pinching force that compresses the spring 412, and opens the latches 408 to release or receive a male coupling member. This spring also provides some compliance in the case of a misalignment.

Figure 5:
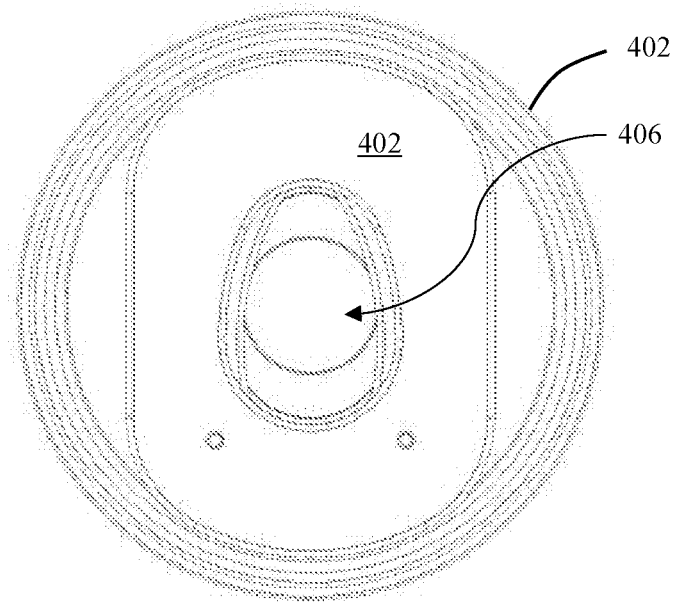
FIG. 5 illustrates a top view of the female coupling member of FIG. 4 in accordance with one embodiment.

FIG. 5 illustrates a top view of the female coupling member 400 of FIG. 4 in accordance with one embodiment. The aperture 406 may be egg-shaped to maintain a continuous convex engagement on an O-ring that is radially mounted on a male coupling member.

The female coupling member 400 may include a necked-down profile that, during insertion of the male coupling, radially compresses the male coupling member's O-ring to form a seal for the vacuum channel. The necked-down section of the female coupling member 400 may be positioned such that the O-ring can clear the latches 408 with minimal contact to minimize wear on the O-ring.

The female coupling member 400 may include a mesh filter (e.g., made from stainless steel cloth) that stops larger particles and objects from traveling up the vacuum channel. The female coupling member 400 may also include features that securely mount selected suction devices such as a lip of a chosen diameter or a thread that can accept a suction device fitting. Some female coupling members may incorporate more than one mounting feature for increased versatility. For example, a single female coupling member may hold an array of suction devices.

Figure 6:
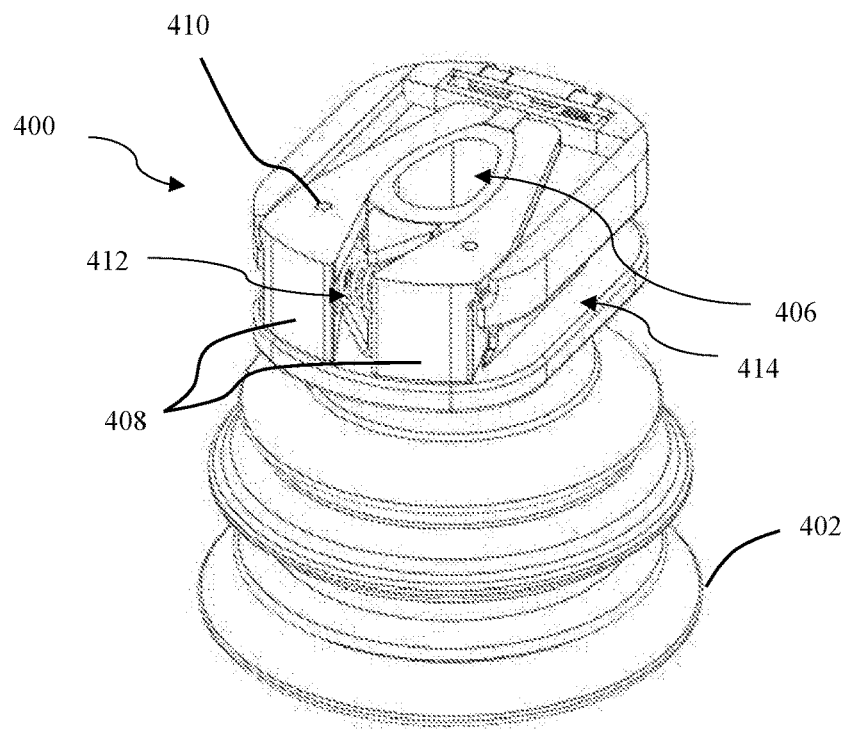
FIG. 6 illustrates the female coupling member of FIG. 4 without a top portion in accordance with another embodiment.

FIG. 6 illustrates the female coupling member 400 of FIG. 4 without the top portion 404. As can seen more clearly in FIG. 6, the latches 408 would rotate about dowel pins 410 upon being inserted onto a storage rack. This would allow a male coupling member to be inserted into the aperture 406 to equip the male coupling member with the suction device 402 or to release a male coupling member from the first coupling member.

Figure 7:
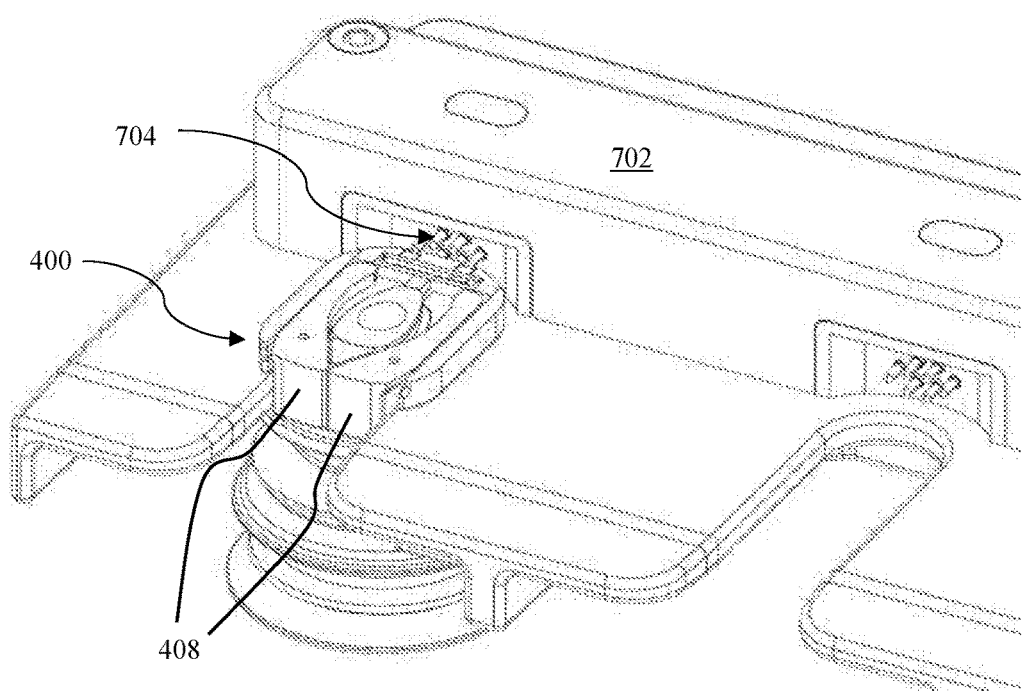
FIG. 7 illustrates a female coupling member positioned in a storage rack in accordance with one embodiment.

FIG. 7 illustrates the female coupling member 400 of FIG. 6 operably positioned on a storage rack 702. As the female coupling member 400 has been inserted into an opening location on the storage rack 702, the latches 408 have rotated to be in an open position. A second coupling member could then be inserted into or otherwise operably connect with the female coupling member 400.

As discussed previously, each female coupling member may house an identification chip that engages with spring-loaded pins 704 at each opening location. Gold-plated copper or brass targets on the chip may mate with spring-loaded gold plated pins to ensure a solid electrical connection. The power and ground targets may be longer in length when compared with the other targets to ensure they contact their corresponding pins first during connection as the female coupling member 400 is inserted in an opening on the storage rack 702.

Figure 8:
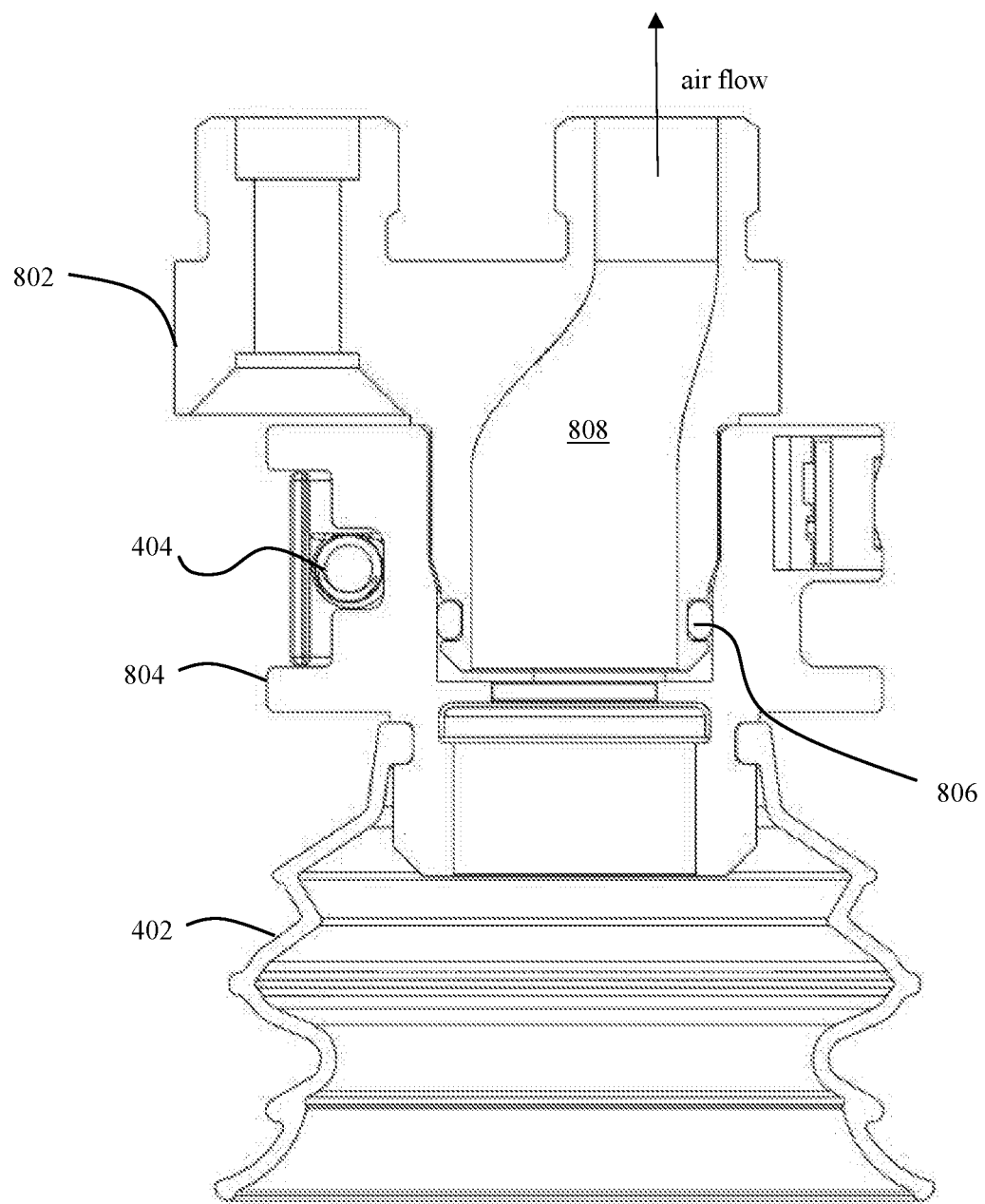
FIG. 8 illustrates a cross sectional view of a male coupling member operably connected to a female coupling member in accordance with one embodiment.

FIG. 8 illustrates a cross sectional view of a male coupling member 802 inserted into or otherwise operably connected with a female coupling member 804. The female coupling member 804 and the male coupling member 802 may be similar to those discussed previously.

The male coupling member 802 may be configured with one or more compressed O-rings 806 to form a seal with the female coupling member 804. A sealed pneumatic channel 808 may run through the male coupling member 802 and female coupling member 804 to provide the suction force.

The embodiments described herein use the maneuverability of the robotic device and its motion to achieve a suction device exchange by moving through prescribed motions to engage mechanisms of the coupling members that interact with mating geometry. As discussed above, this may be achieved through insertion of the male coupling member into an aperture on a female coupling member to move latches that rotate on axes parallel to the coupling axis. The latches of the female coupling member may slide linearly or rotate about axes that are not parallel to the coupling axis. The thickness of the storage rack (such as the storage rack 702 of FIG. 7) may be used to set the geometry for opening one or more latches. Similarly, the storage rack geometry could axially compress a spring in a ball-lock style coupling to open the coupling for use in the same way as described above.

In other embodiments, the robotic device may rotate in order to open a coupling, similar to a bayonet style quick-disconnect fitting. In this embodiment, rolling elements could be incorporated for use in place of sliding elements in order to reduce friction and wear. This could be desirable in applications in which the number of anticipated exchanges is very high.

Figure 9A:
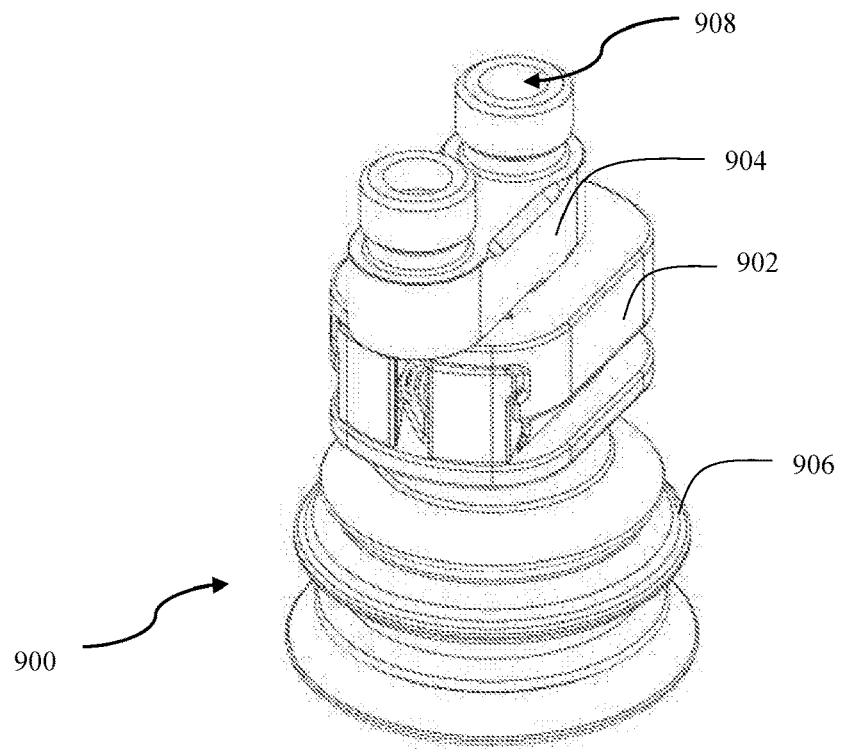
FIGS. 9A & B illustrate front and rear perspective views, respectively, of a male coupling member operably connected to a female coupling member in accordance with one embodiment.

FIG. 9A illustrates a front perspective view of an assembly 900 of a female coupling member 902 and a male coupling member 904 in accordance with one embodiment. As can be seen in FIG. 9A, the female coupling member 902 is configured with a suction device 906. The suction device 906 may provide a suction force generated through aperture 908 via any suitable vacuum components (not shown in FIGS. 9A & B).

Figure 9B:
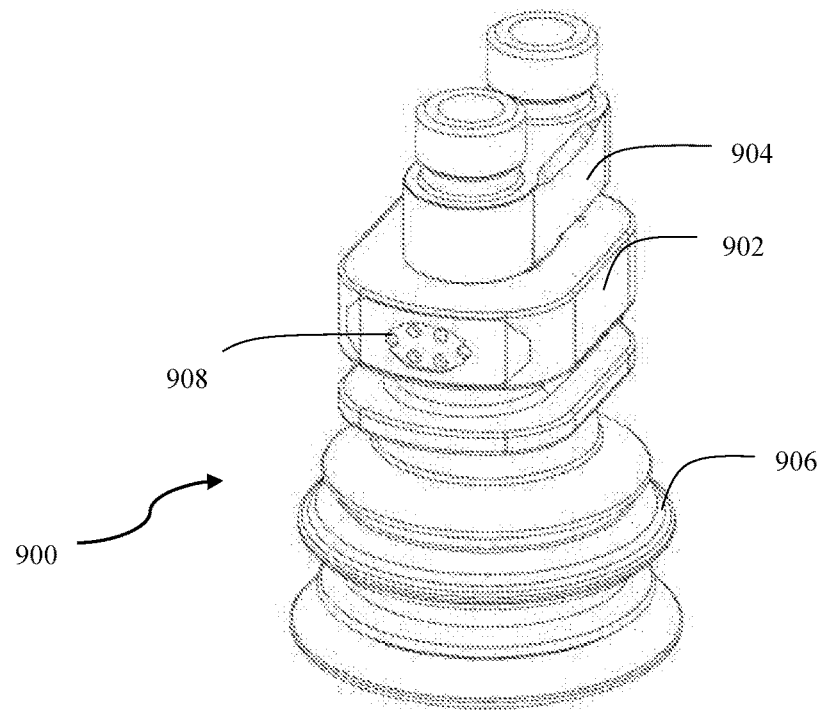

FIG. 9B illustrates a back perspective view of the assembly 900 of FIG. 9A in accordance with one embodiment. As seen in FIG. 9B, the female coupling member 902 includes a plurality of connectors 908 in operable communication with an identification chip (not shown in FIG. 9B). These connectors 908 may contact the spring-loaded pins of a storage rack while the female coupling member 902 is secured on a storage rack to exchange data and communications. These communications may relate to the amount of time a particular female coupling member (and therefore a suction device) has been attached to the robotic device, as well as the number of picking operations performed by the suction device. The embodiments described herein may leverage this information to determine when it may be appropriate to replace a suction device with a new suction device (e.g., due to wear).

Figure 10:
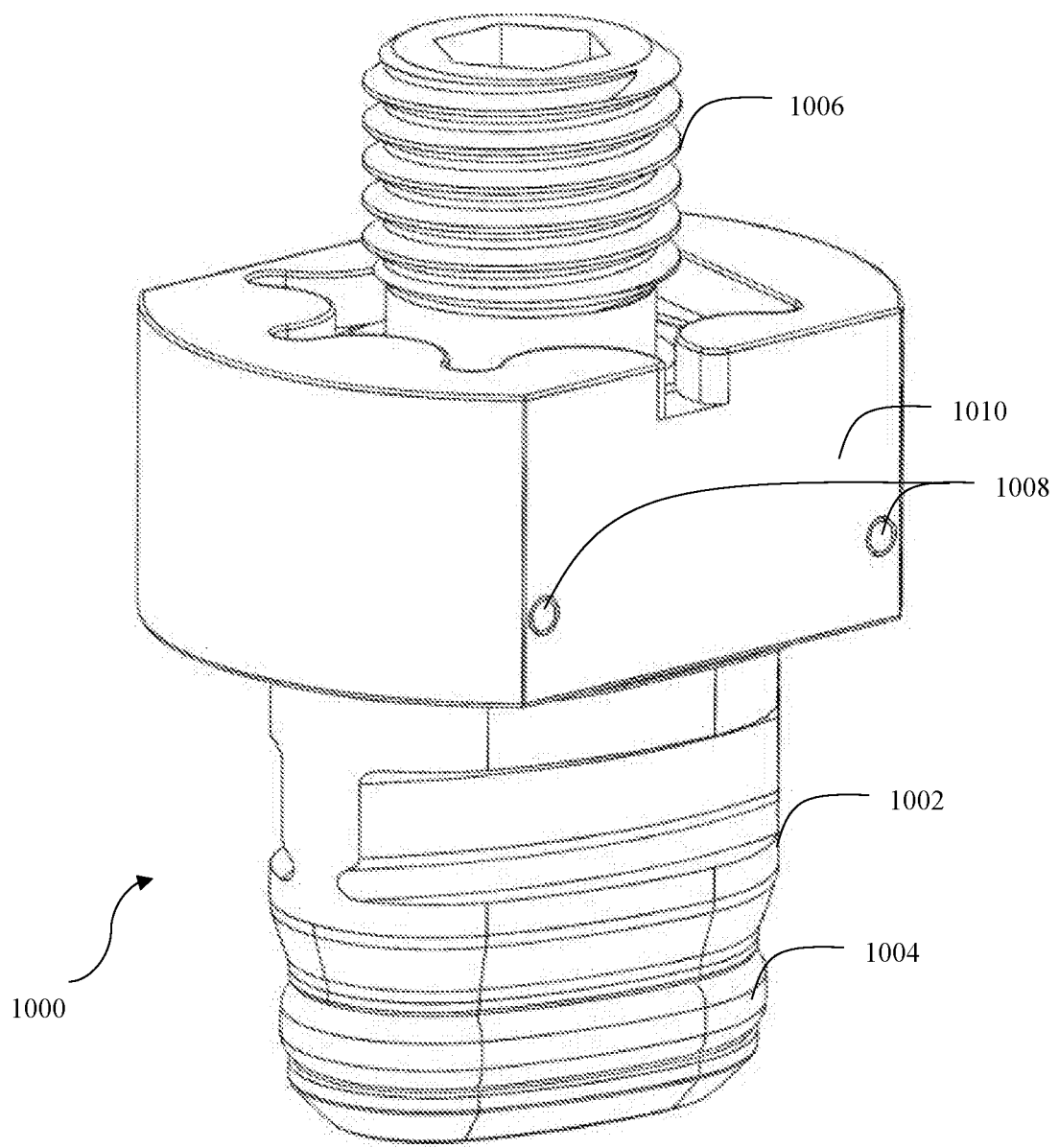
FIG. 10 illustrates a male coupling member in accordance with another embodiment.

FIG. 10 illustrates perspective view of a male coupling member 1000 in accordance with another embodiment. The male coupling member 1000 of FIG. 10 may include a plurality of ridges 1002 that are configured to engage an inner portion of a female coupling member, as well as one or more O-rings 1004 to at least help create a seal while the male coupling member 1000 remains inserted in a female coupling member. Alternatively, one or more O-rings can be configured with the female coupling member.

Additionally, the male coupling member 1000 may include a mounting screw 1006 to connect with a robotic device. The mounting screw 1006 may be held in place within the male coupling member 1000. Dowel pins 1008 may compactly hold the parts together. A splined female threaded shaft may fit into the housing 1010 to secure the mounting screw 1006 as it is fastened. A female hex drive may be incorporated into the mounting screw 1006 and readily accessible. A hex key may be pressed into the mounting screw 1006 and used to turn the mounting screw 1006 until the splined tube bottoms on the housing 1010, thereby compressing the O-ring(s) 1004 to a selected geometry to achieve a seal. Gaps in the housing 1010 allow visual inspection and verification.

Figure 11:
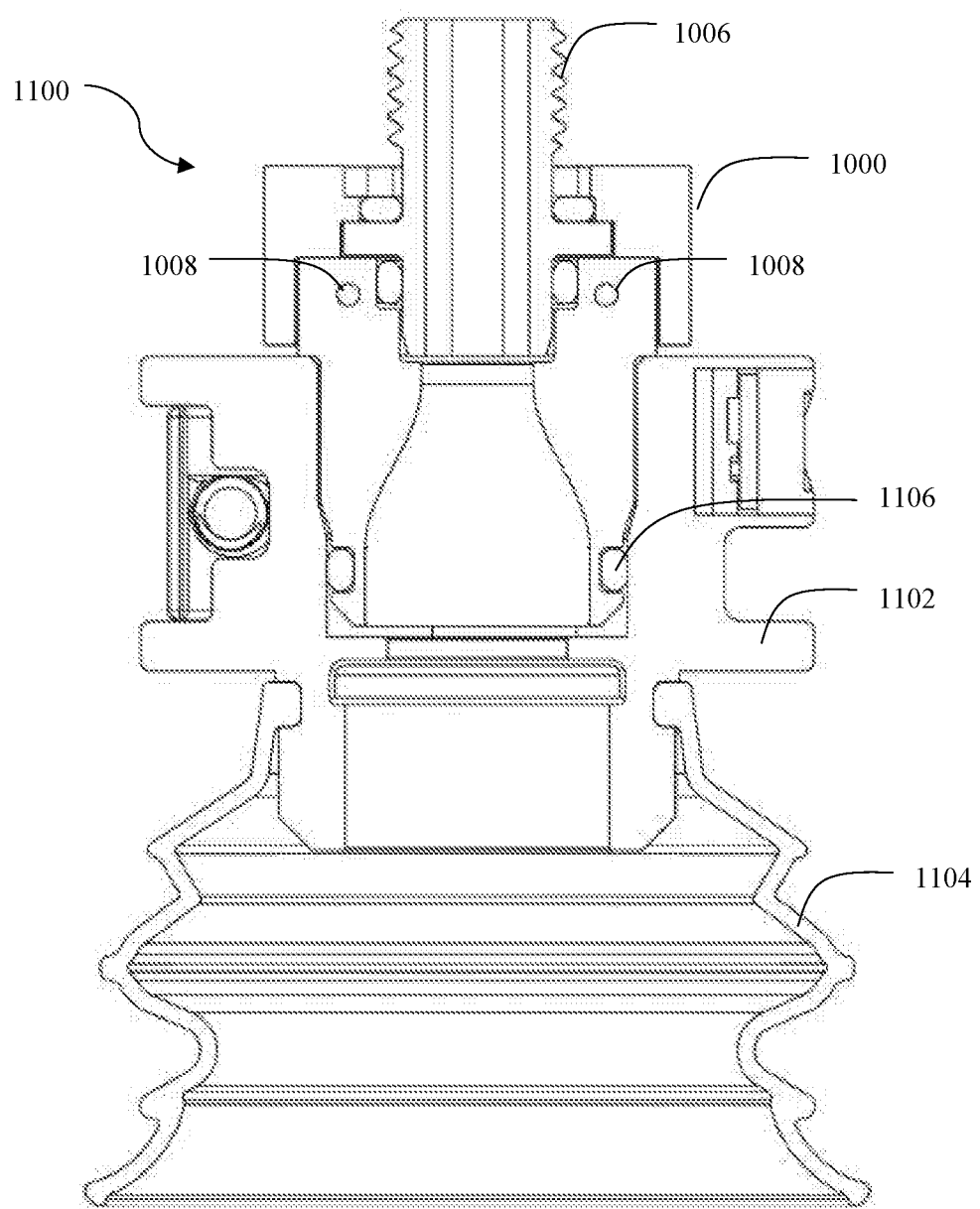
FIG. 11 illustrates a cross sectional view of the male coupling member of FIG. 10 operably connected to a female coupling member in accordance with one embodiment.

FIG. 11 illustrates a cross-sectional diagram of an assembly 1100 that includes the male coupling member 1000 of FIG. 10 inserted into a female coupling member 1102 that includes a suction device 1104. As seen in the assembly 1100, O-ring 1106 creates a seal between the female coupling member 1102 and the male coupling member 1000. The male coupling member 1000 of FIGS. 10 & 11 may be similar to the male coupling member of FIG. 8 with the exception of how it connects to the robotic device. As seen in FIG. 11, dowel pins 1008 hold the various components of the assembly 1100 together.

Figure 12A:
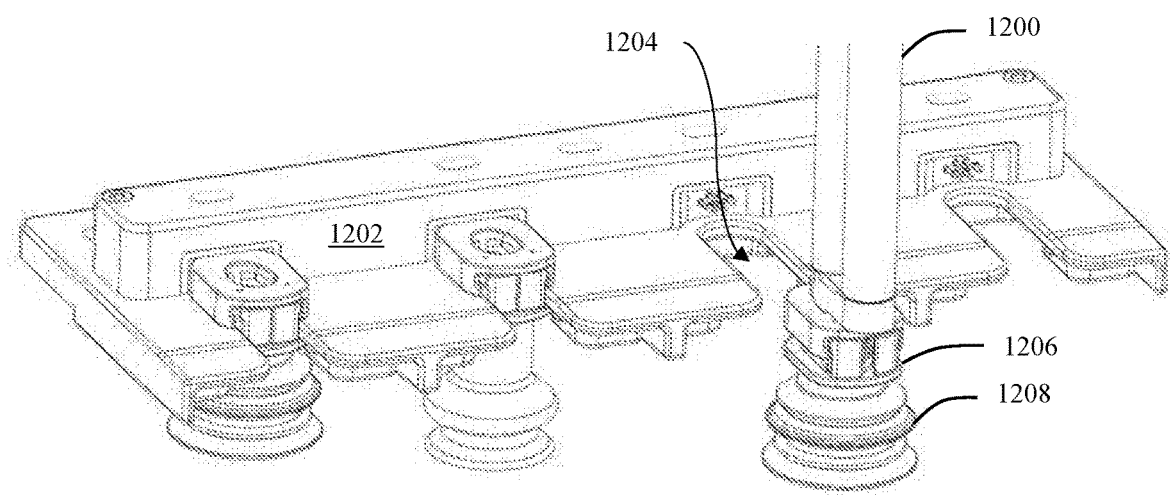
FIGS. 12A & B illustrate a robotic device performing a suction device exchange at a storage rack in accordance with one embodiment.

FIGS. 12A & B illustrate a robotic device 1200 performing a suction device exchange at a storage rack 1202. Specifically, FIG. 12A illustrates the robotic device 1200 moving towards opening 1204 to place a first female coupling member 1206 and a first suction device 1208 therein.

Figure 12B:
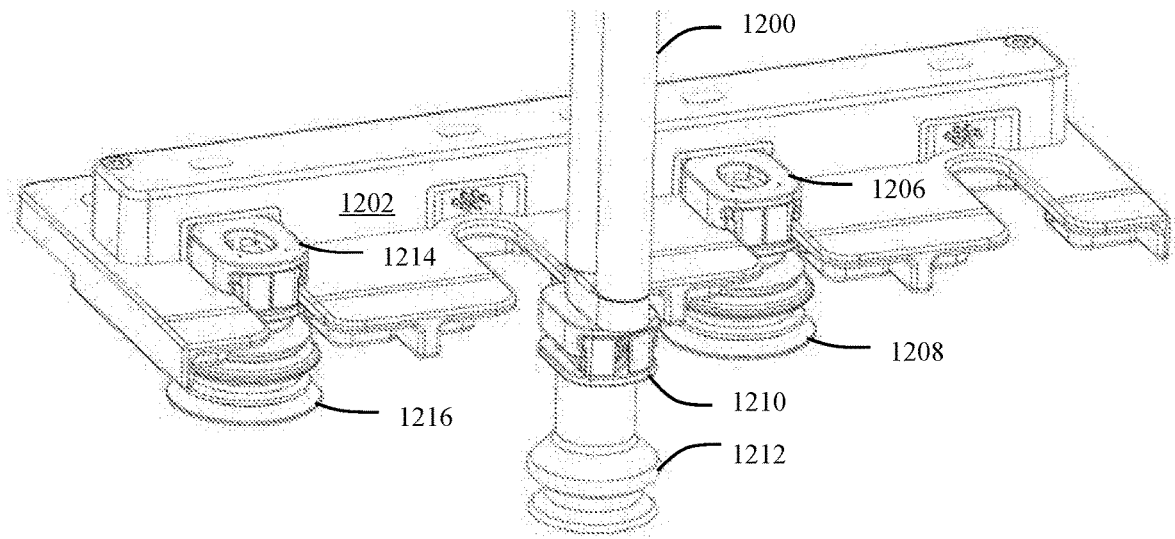

After the first female coupling member 1206 and the first suction device 1208 are placed at the storage rack 1300, the robotic device 1200 may connect with and remove a second female coupling member 1210 with a second suction device 1212 as seen in FIG. 12B. Also shown in FIG. 12B is that suction device 1208 and suction device 1212 are different sizes and are configured (e.g., shaped) differently. Accordingly, the robotic devices and the storage racks of the embodiments described herein may accommodate different types of suction devices.

FIG. 12B also shows a third female coupling member 1214 with a third suction device 1216. The third suction device 1216 is the same type of suction device as the first suction device 1208. Often times, a robotic device may need to replace one suction device with another of the same type, such as when the first suction device is broken, dirty, worn out, has fallen off the robotic device, or the like. The level of wear may be determined by, for example, imagery analysis, visual inspection, and/or based on knowledge regarding the number of picking operations performed.

Figure 13A:
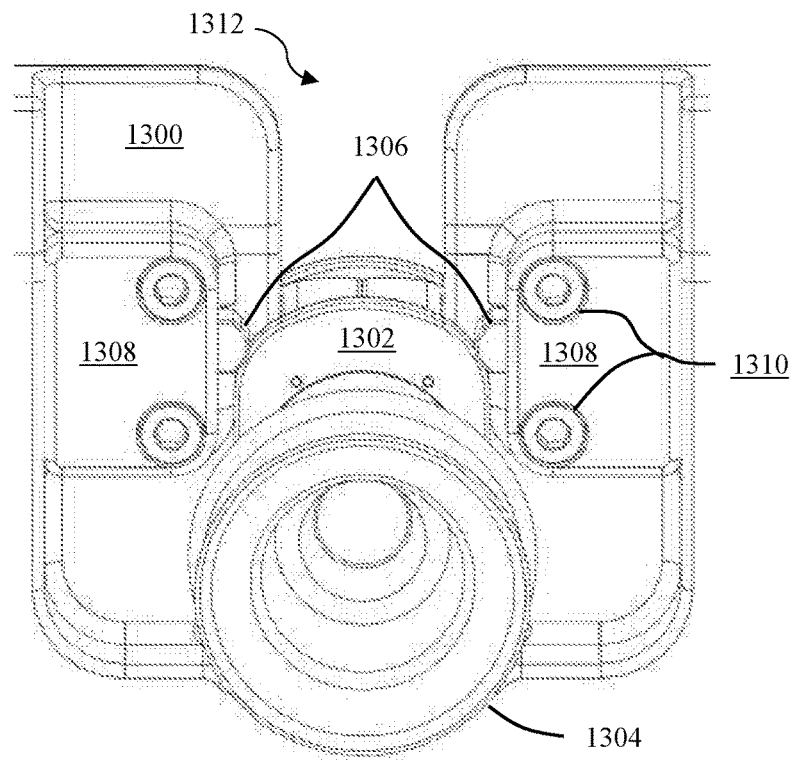
FIGS. 13A & B illustrate a coupling member with a suction device being secured on a storage rack in accordance with one embodiment.

FIGS. 13A & B illustrate a bottom view of a portion of a storage rack 1300. More specifically, FIGS. 13A & B illustrate a female coupling member 1302 configured with a suction device 1304 being secured on the storage rack 1300. As seen in FIG. 13A, the female coupling member 1302 is secured in the storage rack 1300 by two spring-loaded pins 1306. These spring-loaded pins 1306 are secured on the storage rack by covers 1308 that are secured to the storage rack 1300 by bolts 1310. As the robotic device (not shown in FIGS. 13A & B) slides the female coupling member 1302 within the opening location 1312, the female coupling member 1302 applies a force to the spring-loaded pins 1306. This force pushes the spring-loaded pins 1306 away from each other and allows the female coupling member 1302 to move "past" the spring-loaded pins 1306. At this point, the spring-loaded pins 1306 move towards each other and secure the female coupling member 1302.

Figure 13B:
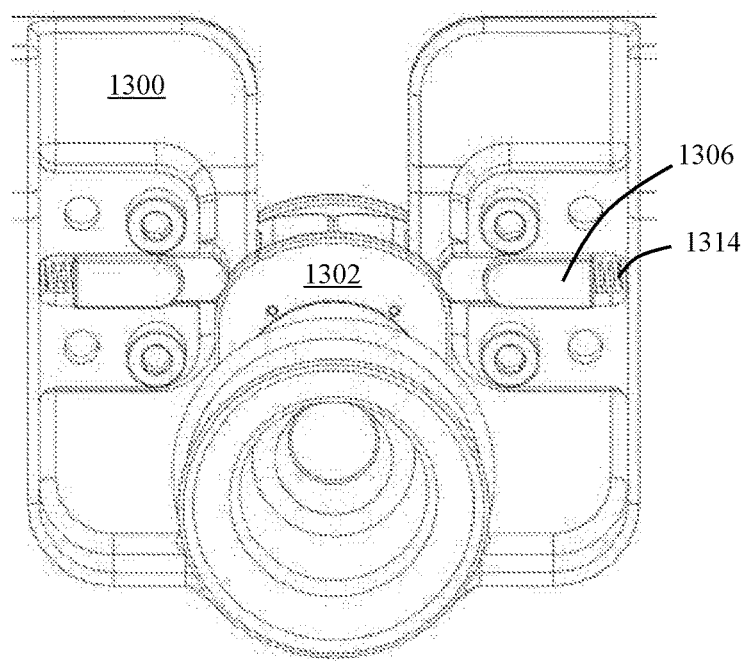

FIG. 13B illustrates the storage rack 1300 with the covers 1308 removed, thereby exposing the spring-loaded pins 1306. As can be seen in FIG. 13B, the spring-loaded pins are biased towards each other by springs 1314. The springs 1314 compress as the female coupling member 1302 moves into the storage rack 1300, but then push the spring-loaded pins 1306 outwards (towards each other) to essentially "lock" the female coupling member 1302 in the storage rack 1300. The rounded edges of the spring-loaded pins 1306 allow the female coupling member 1302 to slide into and out of the storage rack 1300.

Figure 14:
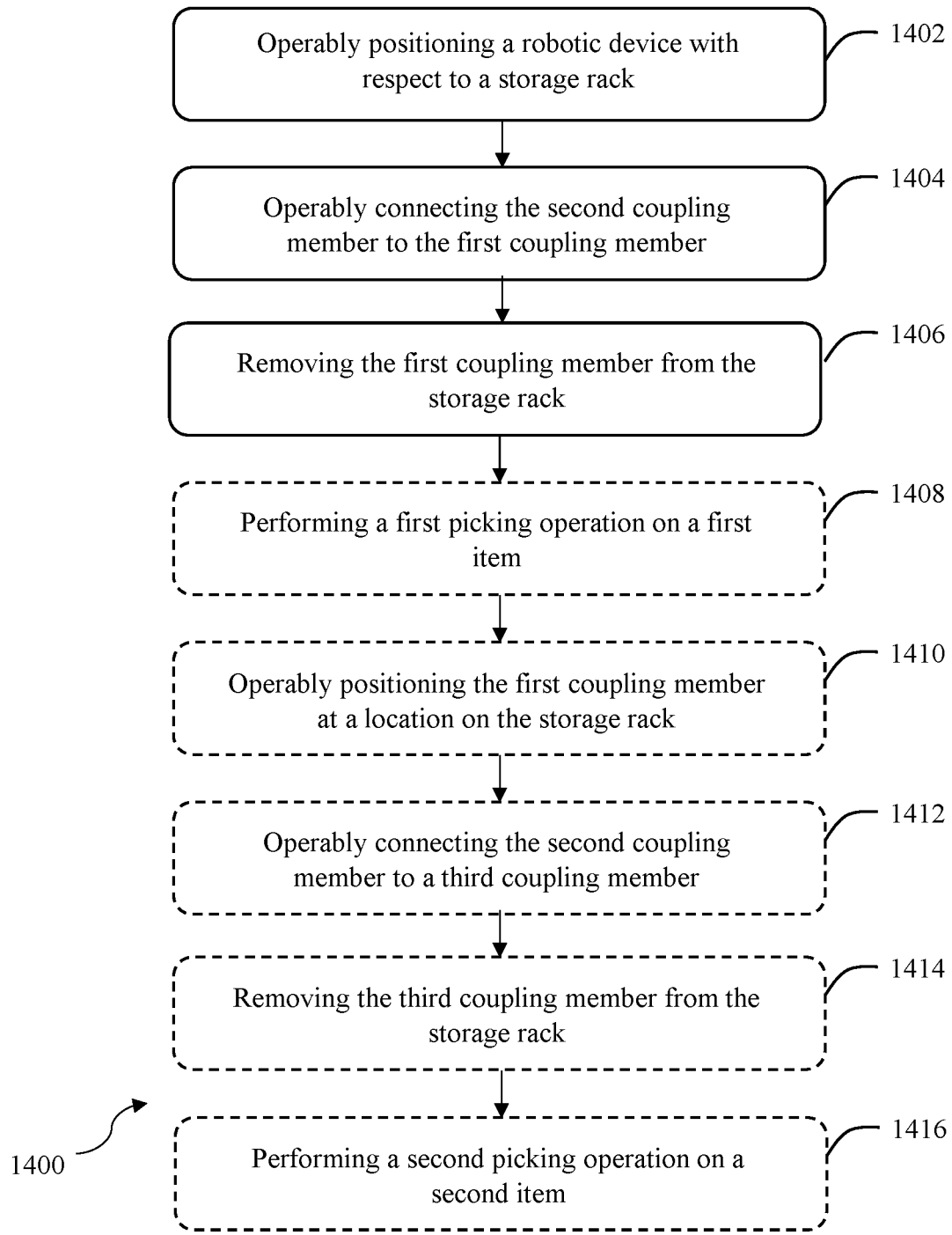
FIG. 14 depicts a flowchart of a method for configuring a robotic device in accordance with another embodiment.

FIG. 14 depicts a flowchart of a method 1400 for performing a picking operation in accordance with one embodiment. Method 1400 may be performed by the system of FIG. 1, for example, as well as any of the components shown in the previous drawings.

Step 1402 involves operably positioning a robotic device with respect to a storage rack, wherein the storage rack holds at least one first coupling member configured with a first tool, and the robotic device includes a second coupling member. The robotic device may be similar to the one shown in FIG. 2, for example, and include a coupling member such as the male coupling member of FIG. 8 or FIG. 10. In this embodiment, the robotic device may be tasked with performing one or more picking operations and may need one or more suction devices to perform the picking operations.

Although the present application is largely described in the context of performing picking operations with suction devices, suction devices may be substituted by a variety of other types of tools. These may include, but are not limited to, cleaning mechanisms, paint applicators, adhesive applicators, other types of end effectors for performing picking operations (e.g., finger portions), cutting tools, or the like. The exact type of tool may vary and may include any type of tool whether available now or invented hereafter.

Step 1404 involves operably connecting the second coupling member to the first coupling member. Imagery gathering devices and imagery analysis procedures may detect where the robotic device is in relation to the first coupling member. The robotic device may adjust its location accordingly to approach the first coupling member in such a way that it can operably connect therewith.

For example, the coupling members of FIGS. 9A & B are configured such that the male coupling member connects with the female coupling member by entering an aperture on the top of the female coupling member. In this embodiment, the robotic device may approach the female coupling member from above.

The robotic device may then move the second coupling member (e.g., the male coupling member 904) to connect with the female coupling member. In the embodiments of FIGS. 9A & B, the robotic device may move the second coupling member to enter the aperture of the female coupling member such that the female couple receives and secures the male coupling member as discussed previously.

Step 1406 involves removing the first coupling member configured with the first tool from the storage rack. Once the male coupling member is secured with the female coupling member, the robotic device may remove the female coupling member (and the suction device or other type of tool) from the storage rack.

Step 1408 involves performing a first picking operation on a first item using the first suction device. As the robotic device is now configured with the suction device, the robotic device may then use the suction device to perform one or picking operations.

Step 1410 involves operably positioning the first coupling member at a location on the storage rack and releasing the first coupling member from the second coupling member. At the conclusion of a picking operation, the robotic device may return the first coupling member to the storage rack. In some embodiments, the robotic device may need to exchange a suction device for a different suction device. For example, the first suction device may be defective or otherwise unable to perform a picking operation on a given item. Accordingly, the robotic device may maneuver the first coupling member to be secured on the storage rack.

Step 1412 involves operably connecting the second coupling member to a third coupling member on the storage rack, wherein the third coupling member is configured with a second suction device. The robotic device may then operably connect with a different coupling member that is configured with another suction device. This may be the same type or a different type or size suction device than the first suction device.

Step 1414 involves removing the third coupling member configured with the second suction device from the storage rack. Similar to step 1406 above, the robotic device may remove the third coupling member from the storage rack.

Step 1416 involves performing a second picking operation on a second item using the second suction device. That is, the robotic device may then proceed with the desired picking operation(s) using the second suction device. Accordingly, method 1400 may involve the robotic device configuring itself with different suction devices (as well as other tools) to perform multiple operations.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A system for configuring a robotic device, the system comprising:
   a storage rack including a plurality of slots that are each configured to hold a first coupling member, wherein the first coupling member includes a first tool, and at least one latch that is configured to hold the first coupling member in a closed position and open the first coupling member upon contacting the storage rack while being inserted on the storage rack to enable the first coupling member to receive the second coupling member; and
   a robotic device configured with a second coupling member, wherein the second coupling member is configured to operably engage the first coupling member to remove the first coupling member and the first tool from the storage rack.

2. The system of claim 1 wherein the first tool is a first suction device.

3. The system of claim 2 wherein the robotic device is further configured to:
   operably position the first coupling member at a first location on the storage rack and release the first coupling member and the first suction device on the storage rack,
   move to a third coupling member at a second location on the storage rack, wherein the third coupling member is configured with a second suction device, and
   operably engage the third coupling member using the second coupling member to remove the third coupling member and the second suction device from the storage rack.

4. The system of claim 3 wherein the first suction device and the second suction device are different types than each other, different sizes than each other, or have different levels of wear.

5. The system of claim 1 wherein the second coupling member includes an extension member with a seal component, the seal component creating a vacuum seal with the first coupling member upon the second coupling member engaging the first coupling member.

6. The system of claim 1 wherein the first tool includes a plurality of suction devices.

7. The system of claim 1 wherein:
   the first coupling member is configured with an identification chip,
   the storage rack is configured with at least one spring loaded pin, and
   the identification chip is configured to engage the at least one spring loaded pin upon insertion of the first coupling member at the storage rack to provide at least one of an electrical connection indicating that the first coupling member is positioned on the storage rack and a communication link with which to communicate data.

8. A method for configuring a robotic device, the method comprising:
   operably positioning a robotic device with respect to a storage rack, wherein the storage rack holds at least one first coupling member configured with a first tool, and at least one latch that is configured to hold the first coupling member in a closed position and open the first coupling member upon contacting the storage rack while being inserted on the storage rack to enable the first coupling member to receive the second coupling member, and the robotic device includes a second coupling member;
   operably connecting the second coupling member to the first coupling member; and
   removing the first coupling member configured with the first tool from the storage rack.

9. The method of claim 8 wherein the first tool is a first suction device.

10. The method of claim 9 further comprising performing a first picking operation on a first item using the first suction device, and
    operably positioning the first coupling member at a location on the storage rack and releasing the first coupling member from the second coupling member.

11. The method of claim 10 further comprising:
    operably connecting the second coupling member to a third coupling member on the storage rack, wherein the third coupling member is configured with a second suction device,
    removing the third coupling member configured with the second suction device from the storage rack, and
    performing a second picking operation on a second item using the second suction device.

12. The method of claim 11 wherein the first suction device and the second suction device are different types than each other, different sizes than each other, or have different levels of wear.

13. The method of claim 11 wherein the first suction device is replaced by the second suction device based on a condition of the first suction device.

14. A system for configuring a robotic device, the system comprising:
    a storage rack including a plurality of locations that are each configured to receive a first coupling member holding a tool, wherein the first coupling member includes at least one latch that is configured to hold the first coupling member in a closed position and open the first coupling member upon contacting the storage rack while being inserted on the storage rack, wherein the storage rack is configured to:
    selectively receive a suction device at a location on the storage rack, and
    selectively release the suction device upon engagement by a robotic device.

15. The system of claim 14 wherein the storage rack further includes at least one identification reader to detect a tool in a location.

16. The system of claim 14 further comprising a first coupling member operably configured to be received by the storage rack at a location, wherein the first coupling member is configured with the tool.

17. The system of claim 16 wherein the robotic device comprises a second coupling member, and the first coupling member is configured to:
 operably connect with the second coupling member, and
 be removed from the storage rack upon operably connecting with the second coupling member.

18. The system of claim 14 wherein the storage rack is configured to hold suction devices of different sizes, different configurations, or different levels of wear.

* * * * *